United States Patent [19]
Redlich

[11] Patent Number: 4,538,256
[45] Date of Patent: Aug. 27, 1985

[54] METHOD AND APPARATUS FOR CUTTING INFORMATION INTO A RECORD CARRIER

[75] Inventor: Horst Redlich, Berlin, Fed. Rep. of Germany

[73] Assignee: TELDEC Telefunken-Decca Schallplatten GmbH, Hamburg, Fed. Rep. of Germany

[21] Appl. No.: 442,123

[22] Filed: Nov. 16, 1982

[30] Foreign Application Priority Data

Nov. 16, 1981 [DE] Fed. Rep. of Germany ....... 3145477
Oct. 7, 1982 [DE] Fed. Rep. of Germany ....... 3237135

[51] Int. Cl.³ .............................................. G11B 3/00
[52] U.S. Cl. ..................................... 369/88; 369/133; 369/175; 381/94; 381/71
[58] Field of Search ............... 369/174, 175, 132, 133, 369/88, 50, 47, 48, 173, 136, 170, 60; 381/13, 94, 71

[56] References Cited

U.S. PATENT DOCUMENTS

| | | | |
|---|---|---|---|
| Re. 22,183 | 9/1942 | Thompson | 369/132 |
| 3,216,730 | 11/1965 | Ogura | 369/173 |
| 3,390,888 | 7/1968 | Klemp et al. | 274/46 |
| 3,403,233 | 9/1968 | Cooper | 179/100.4 |
| 3,490,771 | 1/1970 | Bauer | 369/133 |
| 3,984,867 | 10/1976 | Harnandez | 369/36.1 |
| 4,212,471 | 7/1980 | Nishiwaki | 369/173 |
| 4,248,438 | 2/1981 | Knothe et al. | 369/127 |

FOREIGN PATENT DOCUMENTS 2443914 7/1980 France .

OTHER PUBLICATIONS

International Electronic Review, vol. 19, (1965), No. 1, pp. 15–20.
Sound Recording, 2nd Ed., by John Eargle, ©1980 by Litton Educational Publishing, Inc.
Audio Cyclopedia, 2nd Ed., by Howard Tremaine, ©1969 by Howard W. Sams & Co.
"Continuous Delay Regulator for Controlling Recording Errors", by Duane Cooper, Jan., 1966, vol. 14, No. 1, pp. 7–16, Journal of the Audio Engineering Society.
Bogantz et al, "Project Notes/Engineering Briefs", Journal of the Audio Engineering Society, vol. 25, No. 3, Mar. 1977, pp. 99–100.

*Primary Examiner*—Alan Faber
*Attorney, Agent, or Firm*—Spencer & Frank

[57] ABSTRACT

Method and apparatus for producing a mechanically reproducible recording in a metal disk record by operating an electrically excited cutting stylus to cut a modulated groove in the record, orienting the cutting stylus to be driven at a tracking angle of less than 5°, and electronically compensating recording distortions caused by this tracking angle.

10 Claims, 7 Drawing Figures

METHOD AND APPARATUS FOR CUTTING INFORMATION INTO A RECORD CARRIER

BACKGROUND OF THE INVENTION

The present invention relates to a method and apparatus for cutting information into a record carrier, specifically into a preliminary stage of a phonograph record, i.e. a disk original, by means of an electrically driven cutting stylus.

It is known in connection with the cutting of phonograph records to incline the working plane of a cutting stylus by about 20° with respect to the perpendicular to the record carrier surface, i.e. to provide a vertical tracking angle of 20°. This is necessary to adapt the depth deflection of the cutting stylus to the depth scanning of the pickup stylus. In this way the vertical tracking error during playback is kept low.

It is also known to electrically influence the angle of the cutting plane, if it is different from the standard angle, so that the recording is cut as if it took place at the desired angle. This method compensates for erroneous tracking angles.

When stereo recordings are cut into metal, specifically copper layers, the mechanical stresses acting on the cutting stylus are higher by several orders of magnitude than for customary recordings in lacquer foils. It has now been found that cutting with the customary cutting plane inclination of about 20° leads to increased interfering noises.

SUMMARY OF THE INVENTION

It is an object of the present invention to provide a method and an apparatus for cutting information into a metal disk original record carrier which compensates for the particular conditions encountered when recording in metal layers and which permits the production of high quality recordings.

The above and other objects are achieved, according to the invention, by provision of a method and apparatus for producing a mechanically reproducible recording in a metal disk record by operating an electrically excited cutting stylus to cut a modulated groove in the record, according to which the cutting stylus is oriented to be driven at a tracking angle of less than the standardized angle of to-day 20°, e.g. less than 5°, and recording distortions caused by this tracking angle are electronically compensated.

When information is cut into a metallic record carrier, the cutting resistance encountered by the stylus is much higher than during cutting in a lacquer foil. The cutting resistance depends primarily on the cutting depth, i.e. on the depth recording component of the signal being recorded.

When there is an inhomogeneity in the metal layer being cut and a cutting plane is used which is inclined with respect to the perpendicular to the recording plane, the resulting fluctuating horizontal force component is converted into vertical movement of the cutting stylus. This vertical movement produces interference modulation. The tracking angle selected according to the invention prevents such interference modulation.

The cutting stylus should be oriented to have a small contact angle so as to obtain better chipping conditions for the copper layer. By intentionally setting the tracking angle to a small angle near 0° while simultaneously oppositely distorting the recording signal a recording is obtained whose intermodulation distortions and nonlinear distortions are low and in which the surface quality of the groove walls is better than in a lacquer recording.

The invention will now be described in greater detail with reference to a preferred embodiment.

DESCRIPTION OF THE PREFERRED EMBODIMENTS

Figure 1:
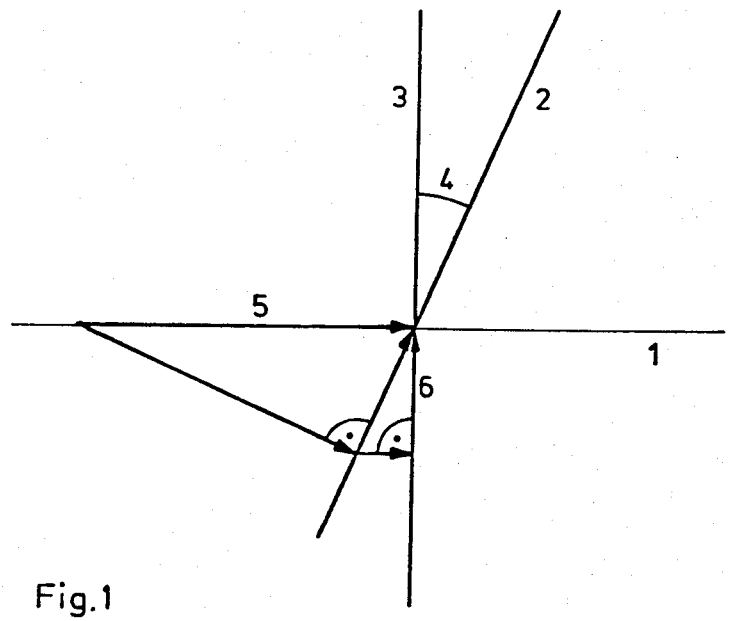
FIG. 1 is a schematic illustration illustrating the forces occurring during cutting of a disk original.

FIG. 1 is a force diagram illustrating the conditions existing during a cutting process. Line 1 represents the plane of the disk original and line 2 corresponds to the direction of vibratory movement of the cutting stylus during cutting of conventional recordings in a lacquer foil. The direction of movement 2 is inclined by an angle 4 of about 20° with respect to the perpendicular 3 to the recording plane. If homogeneities, i.e. variations in the cutting resistance, occur in the record carrier layer, specifically in a metallic record carrier, such variations produce force components which act in a vertical direction. As shown in FIG. 1, a cutting resistance 5 has a component 6 which acts in the vertical direction and whose magnitude is proportional to the magnitude of angle 4. This vertical component thus leads to interference modulation which results from inhomogeneities of the record carrier material. When the magnitude of angle 4 is reduced, force component 6 becomes smaller. In the extreme case, when angle 4 reaches 0°, vertical component 6 disappears completely.

Although it is possible to likewise increase the mechanical impedance of the cutting stylus arrangement—so as to compensate for the mechanical forces which are increased by the inhomogeneities in the metallic layers—this would require a corresponding increase in the electrical driving power, which would become very expensive.

A cutting angle 4 which is intentionally set incorrectly to 0° compared to the pickup requirements, leads to a tracking angle error that causes playback distortions which must be compensated in a suitable manner.

To be able to electrically set the recording tracking angle, which is physically set at 0°, to the standard value of 20°, known circuits for tracking error correction could be used. One suitable method is described, for example, in Internationale Elektronische Rundschau [International Electronic Review], Volume 19 (1965), No. 1, pages 15–20.

Figure 2:
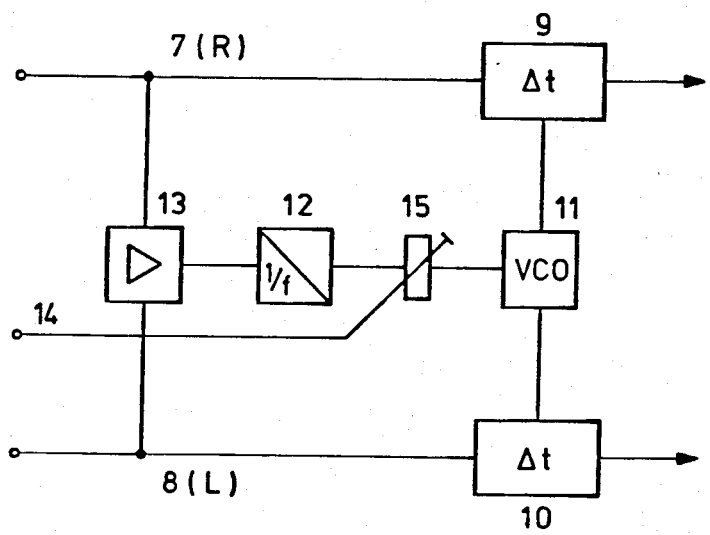
FIG. 2 is a block circuit diagram of a preferred embodiment of an equalizer according to the invention.

FIG. 2 shows an arrangement for compensating an incorrect tracking angle. Electrical stereo signals 7 and 8 to be recorded are conducted through delay chains 9 or 10, respectively. These delay chains are actuated by a voltage controlled oscillator 11 (VCO) in that their delays are proportional to the oscillator frequency.

By difference formation in a difference stage 13, a recording depth dependent signal is derived from stereo signals 7 and 8 and is fed to the VCO via a member 12 whose gain characteristic is inversely proportional to the frequency of the signal applied thereto and an electrically controllable attenuator 15 whose attenuation factor is influenced by a signal at line 14 representing the radial position of the recording stylus. The VCO has a time proportional characteristic.

With increasing frequency, the 1/f member causes the depth recording dependent component to decrease so as to correspond to the recording with constant amplitude to a certain velocity. Therefore, the said component will be reduced by the 1/f member to half its amplitude if the frequency is doubled. The controllable attenuator 15 can be adjusted mechanically or electrically.

By using a circuit according to FIG. 2 it is possible to avoid or to reduce intermodulation distortions which are caused by a tracking, cutting or clearance angle of the cutting stylus in case the said angle does not correspond to the standardized tracking angle. Even with excellent reduction of such distortion, however, there remained audible low frequency noise of e.g. 100 cycles. This noise was found to be caused by difference type signals caused by adjacent frequencies of the stereo signals e.g. 1.000 kilocycles and 1.100 kilocycles.

Figure 3:
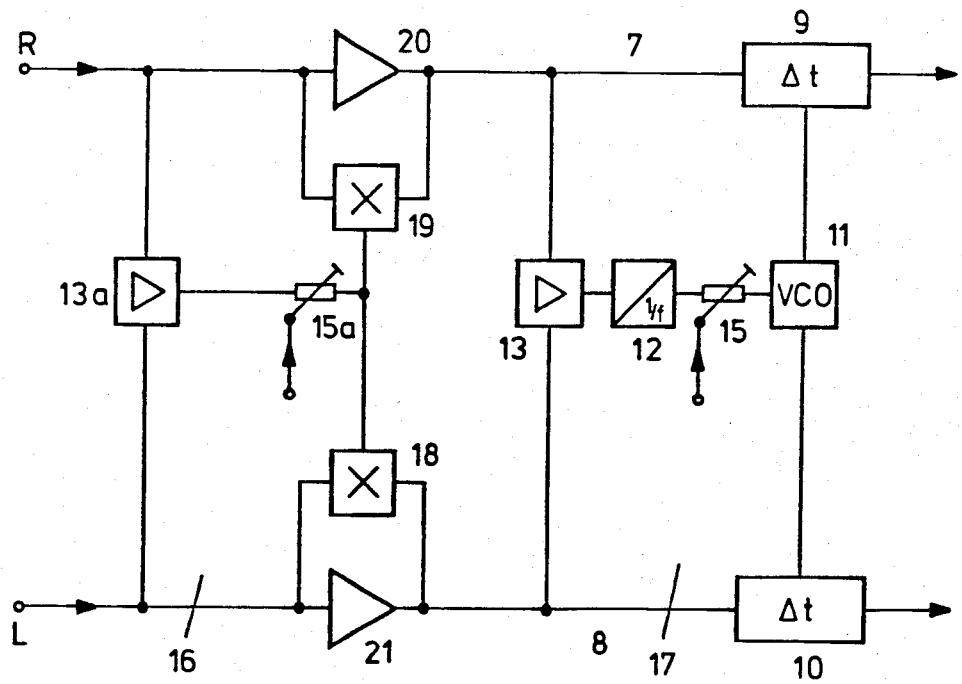
FIGS. 3 and 4 are block circuit diagrams of two further preferred embodiments of an equalizer according to the invention.

FIG. 3 shows an arrangement for compensating the low frequency noise caused by the adjacent frequencies. The stereo signals R and L fed to the delay chaines 9,10 of the circuit 17 (which corresponds to FIG. 2) are derived from a circuit 16 designed to reduce even harmonics especially second harmonics in the stereo signals R and L. Similar to FIG. 2 there is provided a difference stage 13a deriving from stereo signals R,L a recording depth dependent signal corresponding to the difference of signals R and L. This signal is influenced in its amplitude by an attenuator 15a providing an attenuating factor representing the radial position of the recording stylus. The output signal of the attenuator 15a is fed to two harmonic generators 18,19 which receive at the same time stereo signals R or L resp. The output signals fed by generators 18,19 into the output circuit of amplifiers 20,21 reduce in lines 7 or 8 resp. harmonic distortions. At the same time they feed into line 7 or 8 resp. low frequency noise of the same frequency as caused by circuit 17 but of contrary sign. So the low frequency noise signals provided by circuits 16 and 17 cancel each other. The results of the whole circuit are stereo signals R,L at the output of the circuit shown in FIG. 3 which are free of intermodulation distortions, harmonic distortions and of low frequency noise as provided by the circuit of FIG. 2.

Figure 4:
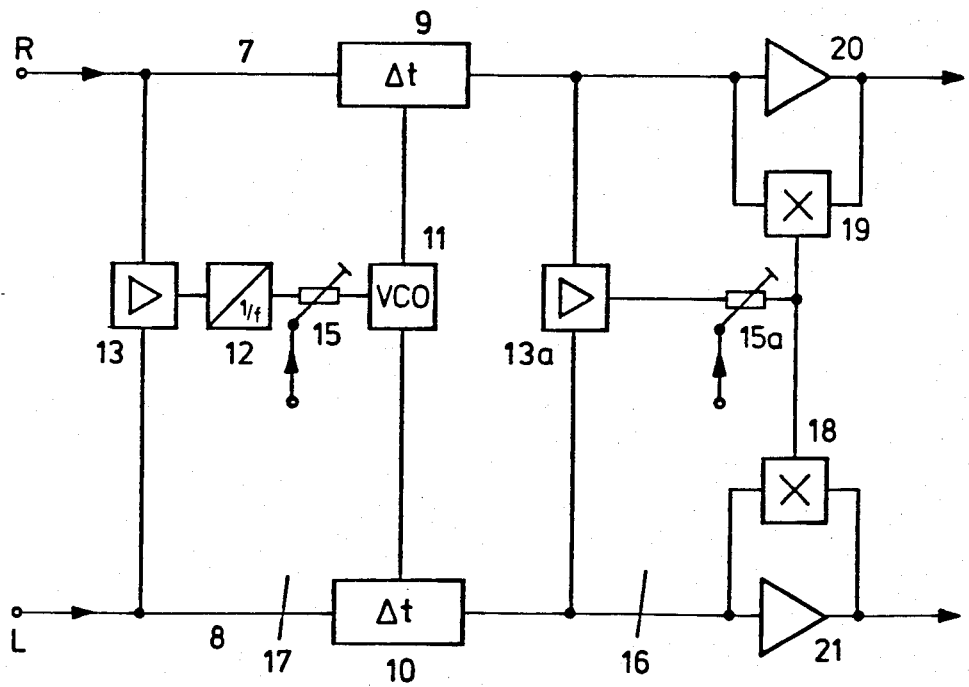

FIG. 4 shows a circuit arrangement similar to the circuit shown in FIG. 3. In FIG. 4 circuits 16,17 are exchanged to avoid overload of amplifiers in circuit 17 by signals of circuit 16.

Figure 5:
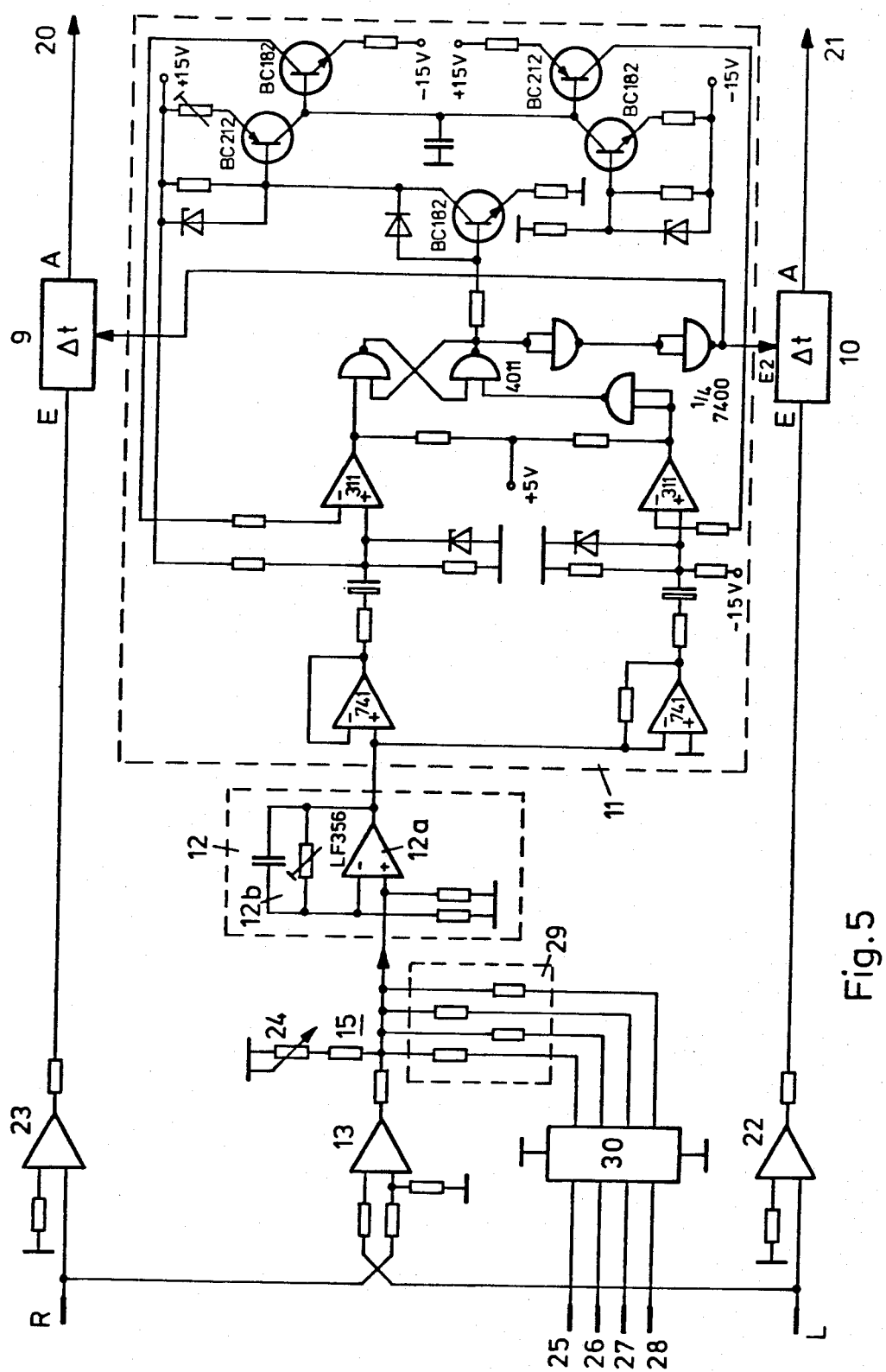
FIG. 5 is a detailed circuit diagram of one form of construction of the embodiments of FIGS. 2 and 4.

FIG. 5 shows a detailed arrangement according to FIG. 2 and FIG. 4. The stereo signals R and L available at the input terminals are fed via amplifiers 22,23 to the inputs E of delay chains 9,10 which are shown in detail in FIG. 7. The stereo signals R,L are further fed to an amplifier 13 which produces at its output the difference of signals R and L which difference is a recording depth dependant signal. The said output signal of amplifier 13 can be adjusted in amplitude by means of a potentiometer or a variable resistor 24. The amplitude of the output signal can be varied, too, by means of an attenuator 15 which can be varied or adjusted electrically by a voltage divider 24,29 actuated via an amplifier 30 by pickups 25,26,27,28 or other devices measuring the position of the cutting stylus during the cutting procedure. The output signal of 15 is fed to circuit 12 which is shown as an amplifier 12a having frequency dependant negative feedback via RC circuit 12b so as to deliver a signal the amplitude of which decreases with increasing frequencies. In its most simple form circuit 12 can bei designed as a RC-circuit i.e. a series connected resistor the output of which is connected to earth via a capacitor. With the circuit 12 shown the amplitude of a certain wave of the difference type signal will be decreased to half of its value if the frequency of said wave is doubled. The output of circuit 12 is connected to the input of the voltage dependant oscillator (VCO) 11 and varies the frequency of the said oscillator output wave according to the varying output voltage of circuit 12. The output wave of the VCO 11 is a pulse shaped one. The frequency of the output wave of VCO 11 is varied according to the input of VCO 11 in such a manner that the change of amplitude in control voltage causes a corresponding change in sampling time of the output wave. The principle of such an oscillator is described in German Spec. No. 23 33 062. The output wave of VCO 11 is fed to the controlling input E2 of the delay chains 9,10. The outputs A of the delay chains are connected e.g. to amplifiers 20,21 of circuit 16 shown in FIG. 4.

Figure 6:
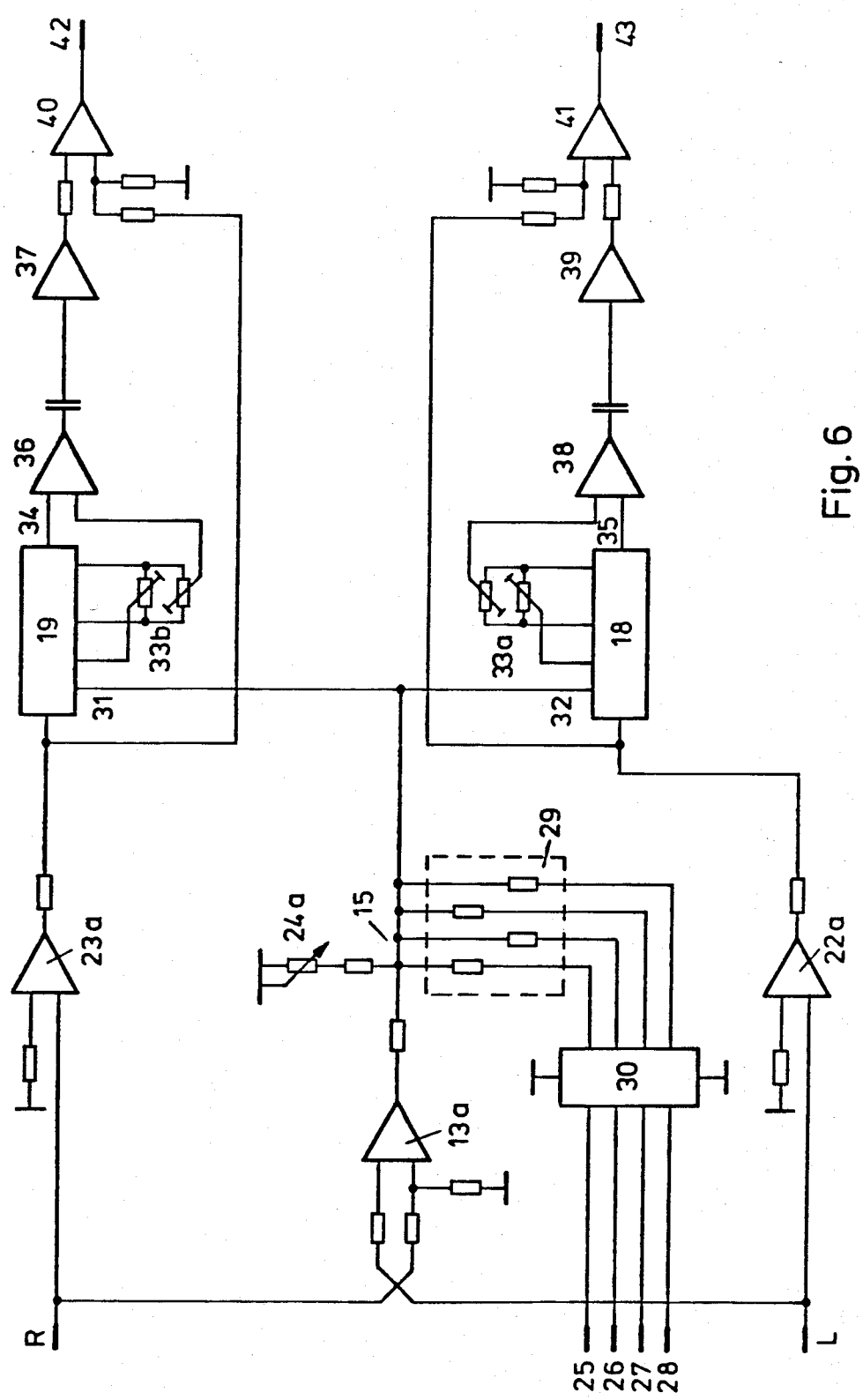
FIG. 6 is a detailed circuit diagram of one component of the embodiment of FIG. 4.

In FIG. 6 there is shown in detail circuit 16 of FIG. 4. The stereo signals R and L are fed to amplifiers 22a and 23a resp. The outputs of the amplifiers 22a,23a are connected to circuits 18,19 for which there can be used socalled multiplicators e.g. integrated circuits MC 1494 manufactured by Motorola. In addition R and L are fed to an amplifier 13a producing at its output the difference of signals R and L. With regard to parts 131,15,22a,23a,24a,25,26,27,28,29,30, the circuitry is similar to that shown in FIG. 5. The output signal of circuit 15 which represents a recording depth depending and a stylus position depending signal is fed to second inputs of multiplicators 18,19. Attenuators 33a and 33b are used to adjust the harmonic content of the output signal. The outputs 34,35 are connected via amplifiers 36,37 and 38,39 resp. to adding stages 40,41. In the adding stages the harmonic content is added to the R and L signals resp. in a sense in which the content of even harmonics is reduced by compensation. Adding stages 40,41 deliver stereo signals which are nearly free of even harmonics. The circuit further introduces into signals R,L an additional low frequency noise corresponding to the difference of certain adjacent frequencies occurring in the stereo signals. The stereo signals R,L containing said low frequency noise are fed to outputs 42,43 and hence to the input of circuit 17 which produces the same low frequency noise. By subtraction of the low frequency noise of circuit 16 from the low frequency noise of circuit 17 or vice versa the final stereo signals of the whole circuit shown in FIG. 4 are free or nearly free from any low frequency noise and from further distortions, too, which distortions were caused by a cutting stylus which is adjusted to a cutting angle other than the standardized one.

Figure 7:
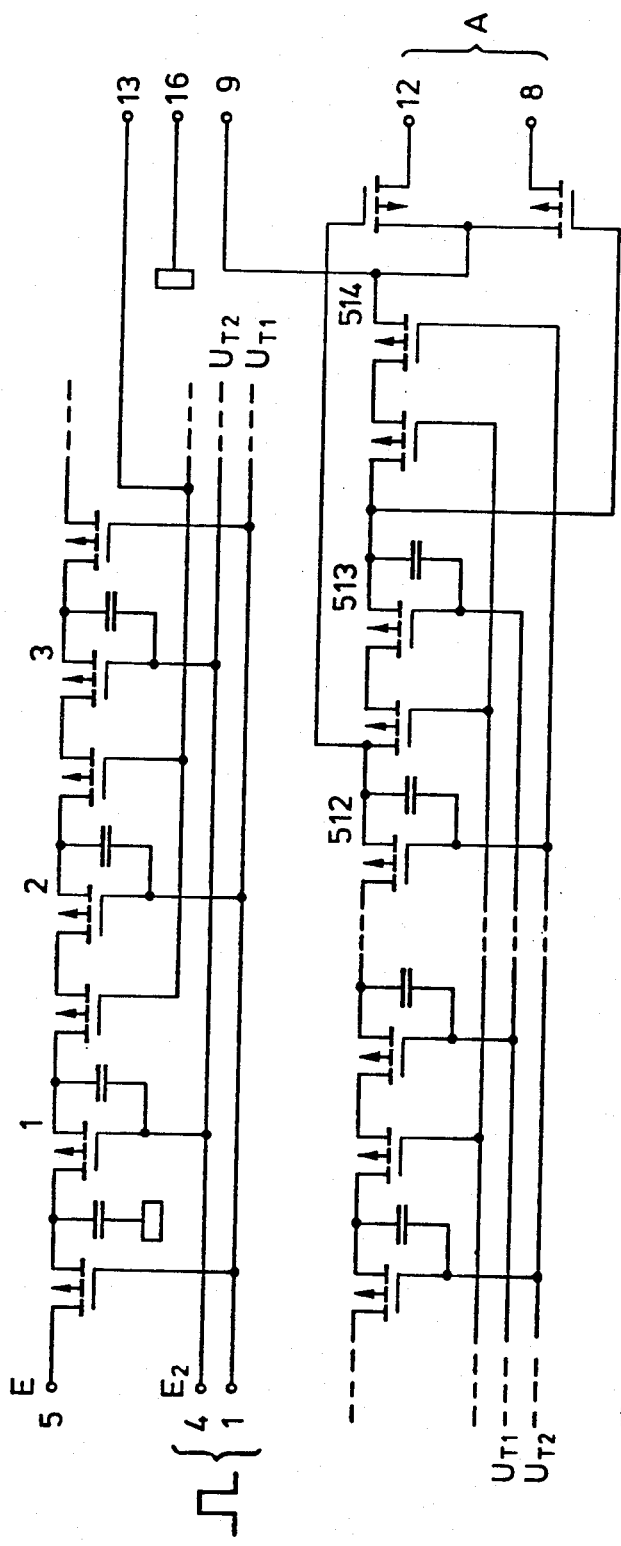
FIG. 7 is a detailed circuit diagram of one form of construction of the delay chains of FIGS. 2 and 5.

FIG. 7 shows an example for the delay chain of FIG. 5. With one embodiment the chain is designed to have eight storage places of about 20 $\mu$s delay each. With a controlling input wave having a frequency between 50 kilocycles and 500 kilocycles at input E2 (terminals 1,4) the delay can be varied between 8 $\mu$s and 80 $\mu$s.

What is claimed is:

1. Apparatus for producing a mechanically reproducible recording in a metal disk record by operating an electrically excited cutting stylus to cut a modulated groove in the record, comprising: a cutting stylus; means supporting said stylus at an orientation to be driven at a tracking angle of less than 20°; means connected for electronically compensating recording distortions caused by this tracking angle and including means for determining the recording depth component of the information to be recorded by forming the difference between the signal components of two stereo signal channels, means for modifying the amplitude of the component inversely to the frequency, a voltage controlled oscillator connected to produce output oscillations at a frequency dependent on the amplitude of the modified depth component, and controllable time delay means connected to the oscillator and interposed in each stereo signal channel for varying the delay of each stereo signal as a function of the frequency of the output from said oscillator; and means for compensating low frequency distortions introduced into each stereo signal by said means for electronically compensating recording distortions, said low frequency distortion compensating means comprising means for providing a signal representative of the recording depth component of the information to be recorded; two even harmonic signal generators each associated with a respective stereo signal channel and each having a first input connected to receive the stereo signal in its associated channel, a second input connected to receive the recording depth component representative signal, and an output providing a compensating signal containing a component representative of even harmonics of the stereo signal in its associated channel and a component proportional in amplitude and opposite in phase to the low frequency distortions produced by said means for electronically compensating recording distortions, and two adder means each associated with a respective stereo signal channel and each connected for adding the compensating signal produced by its associated even harmonic signal generator to the stereo signal in its associated channel in a manner to compensate such low frequency distortions.

2. Apparatus as defined in claim 1 wherein said means for electronically compensating recording distortions further comprise means for superposing on the recording depth component radius information representative of the present radial location of said cutting stylus on the record.

3. Apparatus as defined in claim 2 wherein said superposing means act to influence the amplitude of the recording depth component in stages by the radius information.

4. Apparatus as defined in claim 2 wherein said superposing means act to influence the delay of the stereo signal in each channel by the radius information.

5. Apparatus as defined in claim 4 wherein said oscillator has a time proportional characteristic.

6. Apparatus as defined in claim 1 wherein said disk is essentially made of copper.

7. Apparatus as defined in claim 1 wherein said cutting stylus is made of diamond.

8. Apparatus as defined in claim 1 wherein said stylus is supported to be driven at a tracking angle of less than 5°.

9. A method for producing a mechanically reproducible recording in a metal disk record by operating an electrically excited cutting stylus to cut a modulated groove in the record, comprising:
   orienting the cutting stylus to be driven at a tracking angle of less than 20°;
   providing two stereo signals to be recorded;
   electronically compensating distortions caused by the tracking angle by deriving a representation of the amplitude of recording depth component which will be produced by the signals, producing oscillations at a frequency dependent on the amplitude of the depth recording component by means of a voltage controlled oscillator controlled by the representation, and delaying the signals as a function of the frequency of the oscillations by means of a controllable delay member controlled by the oscillator and connected to conduct the signals to the cutting stylus; and
   compensating low frequency distortions introduced into the signals by said step of electronically compensating by adding to each signal, before it is conducted to the cutting stylus, a compensating component equal in amplitude and opposite in phase to the low frequency distortions.

10. Method as defined in claim 9 wherein said tracking angle is substantially 0°.

* * * * *